(12) United States Patent
Hiraoka et al.

(10) Patent No.: US 11,630,963 B2
(45) Date of Patent: Apr. 18, 2023

(54) DETECTING SYSTEM, AND READER

(71) Applicant: Konica Minolta, Inc., Tokyo (JP)

(72) Inventors: Saburou Hiraoka, Kodaira (JP);
Nobuaki Takahashi, Tama (JP);
Takumi Ishiwata, Mitaka (JP)

(73) Assignee: Konica Minolta, Inc., Tokyo (JP)

( * ) Notice: Subject to any disclaimer, the term of this patent is extended or adjusted under 35 U.S.C. 154(b) by 59 days.

(21) Appl. No.: 17/283,637

(22) PCT Filed: Oct. 30, 2019

(86) PCT No.: PCT/JP2019/042609
§ 371 (c)(1),
(2) Date: Apr. 8, 2021

(87) PCT Pub. No.: WO2020/090904
PCT Pub. Date: May 7, 2020

(65) Prior Publication Data
US 2021/0390274 A1    Dec. 16, 2021

(30) Foreign Application Priority Data

Nov. 2, 2018  (JP) .............................. JP2018-207687

(51) Int. Cl.
*G06K 7/10* (2006.01)
*H01Q 1/24* (2006.01)
*H01Q 19/10* (2006.01)

(52) U.S. Cl.
CPC .......... *G06K 7/10366* (2013.01); *H01Q 1/24* (2013.01); *H01Q 19/10* (2013.01)

(58) Field of Classification Search
CPC .......... G06K 7/10366; G06K 19/0672; G06K 19/067; H01Q 1/24; H01Q 19/10

USPC ................................................. 340/10.1–10.5
See application file for complete search history.

(56) References Cited

U.S. PATENT DOCUMENTS

| | | | |
|---|---|---|---|
| 7,446,861 B2 * | 11/2008 | Ouchi ................. | G06F 3/03545 356/5.01 |
| 11,209,536 B2 * | 12/2021 | Joshi ..................... | G01S 13/538 |
| 2017/0229000 A1 * | 8/2017 | Law ....................... | G01K 1/024 |

(Continued)

FOREIGN PATENT DOCUMENTS

| | | | | |
|---|---|---|---|---|
| JP | 2001-134726 A | 5/2001 | | |
| WO | WO-2016027359 A1 * | 2/2016 | ............... | A61B 5/01 |
| WO | WO-2020090904 A1 * | 5/2020 | ........... | G06K 19/067 |

OTHER PUBLICATIONS

International Search Report dated Jan. 7, 2020 filed in PCT/JP2019/042609.

(Continued)

*Primary Examiner* — Nam V Nguyen
(74) *Attorney, Agent, or Firm* — Rankin, Hill & Clark LLP

(57) ABSTRACT

A detecting system includes: a sensor (10) that includes an antenna unit (11) formed with a metal pattern, and a back surface reflector (13) that faces the antenna unit (11) via an isolation layer (12); and a reader (20) that transmits electromagnetic waves (Fa) to the sensor (10), receives reflected waves (Fr) from the sensor (10), and compares the reflection characteristics of the sensor (10) detected from the reflected waves (Fr) with the reflection characteristics of the sensor (10) stored in advance, to detect a state change in the sensor (10).

18 Claims, 17 Drawing Sheets

(56) References Cited

U.S. PATENT DOCUMENTS

2019/0280034 A1\* 9/2019 Jeon .................. H01L 27/14621

OTHER PUBLICATIONS

Borgese et al., "An Inkjet Printed Chipless RFID Sensor for Wireless Humidity Monitoring", IEEE Sensors Journal, 2 017, vol. 17, No. 15, pp. 4699-4707; Cited in EESR.
Extended European Search Report (EESR) dated Jan. 28, 2022 for corresponding European Patent Application No. 19878052.0.

\* cited by examiner

DETECTING SYSTEM, AND READER

TECHNICAL FIELD

The present disclosure relates to detecting systems and readers.

BACKGROUND ART

Detecting systems that use electromagnetic waves to detect a state change in an object or an environmental change in the surroundings of an object have been known.

A detecting system of this kind normally includes a sensor having an antenna unit, and a reader that transmits and receives electromagnetic waves. In a detecting system of this kind, the reader uses a method of detecting a state change in the sensor by receiving reflected waves from the sensor when transmitting electromagnetic waves of a predetermined frequency to the sensor.

Being capable of detecting a state of an object in a non-contact manner, a detecting system of this kind is expected to be used for various purposes such as product management.

In view of such backgrounds, Patent Literature 1 discloses a detecting system that has an LC resonance tag attached to a diaper or a urine adsorption pad, and detects a state change (smudge) in an object from a change caused in frequency characteristics by the diaper or the urine adsorption pad absorbing excretion, for example. This patent literature discloses that, in the case of urine leakage, a urine absorption pad 6 absorbs urine, and the resonance frequency characteristic of an LC resonance tag 5 in contact with the liner changes accordingly.

CITATION LIST

Patent Literature

Patent Literature 1: JP 2001-134726 A

SUMMARY OF INVENTION

Technical Problem

In a detecting system of this kind, however, the intensity of reflected waves from the sensor is hardly maintained, and therefore, it is normally difficult to perform state detection with high accuracy. Because of this, it is difficult to use a conventional detecting system for state detection, except for rough state detection such as determination as to whether the sensor has left a detection target region.

Further, the detecting system disclosed in Patent Literature 1 detects a change caused in frequency characteristics by a change in the amount of moisture around the LC resonance tag. However, changes caused in resonance peaks by changes in the state of an object are small, and therefore, the accuracy of detecting state changes in the object is low.

Particularly, in a detecting system of this kind, electromagnetic waves in a high frequency band such as millimeter waves or gigahertz frequency waves are used for miniaturization of the sensor (which is the metal pattern forming the antenna unit). Therefore, in a case where the propagation attenuation factor of electromagnetic waves is large (typically, the intensity of electromagnetic waves decreases in inverse proportion to the fourth power of the distance), and the distance between the reader and the sensor is long, detection accuracy drops significantly.

The present disclosure is made in view of such problems, and aims to provide a detecting system and a reader that are capable of detecting a state change in an object or an environmental change in the surroundings of an object with high accuracy.

Solution to Problem

A principal aspect of the present disclosure for solving the above problem is a detecting system that includes:

a sensor including: an antenna unit formed with a metal pattern; and a back surface reflector that faces the antenna unit via an isolation layer, and a reader that transmits electromagnetic waves to the sensor, receives reflected waves from the sensor, and compares reflection characteristics of the sensor detected from the reflected waves with reflection characteristics of the sensor stored in advance, to detect a state change in the sensor.

Further, another aspect is a reader that detects a state change in a sensor that includes an antenna unit formed with a metal pattern and a back surface reflector facing the antenna unit via an isolation layer, the reader including:

a transmitting unit that transmits electromagnetic waves to the sensor, a receiving unit that receives reflected waves from the sensor, the reflected waves being generated when the transmitting unit transmits the electromagnetic waves; and a state detecting unit that detects a state change in the sensor, by comparing reflection characteristics of the sensor detected from the reflected waves received by the receiving unit with reflection characteristics of the sensor stored in advance.

Advantageous Effects of Invention

With a detecting system according to the present disclosure, a state change in an object or an environmental change in the surroundings of an object can be detected with high accuracy.

DESCRIPTION OF EMBODIMENTS

Figure 1:
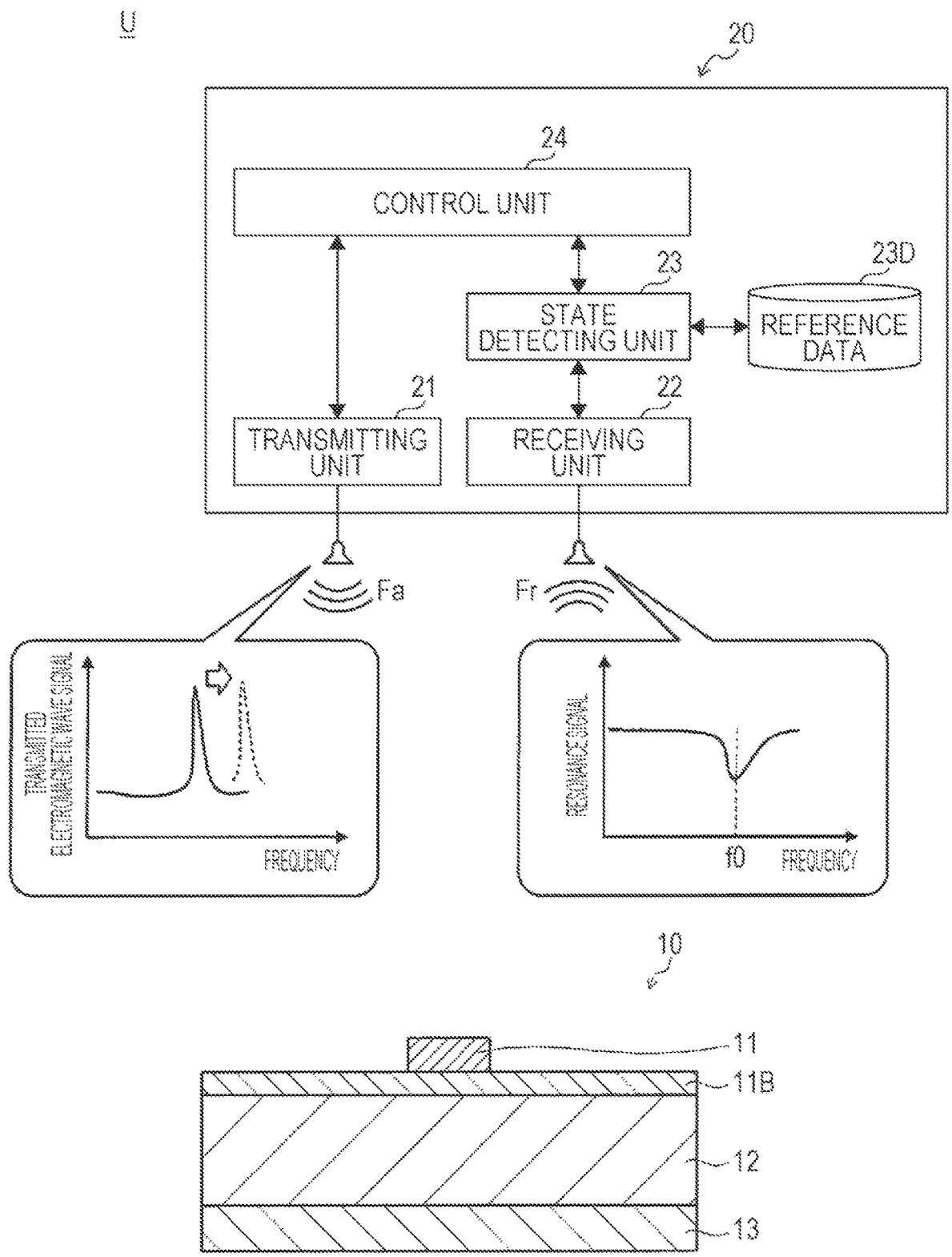
FIG. 1 is a diagram illustrating a basic configuration of a detecting system according to the present disclosure.

The following is a detailed description of preferred embodiments of the present disclosure, with reference to the accompanying drawings. Note that, in this specification and the drawings, components having substantially the same functions are denoted by the same reference numerals, and the same explanation is not repeated.

[Basic Configuration of a Detecting System]

Figure 2:
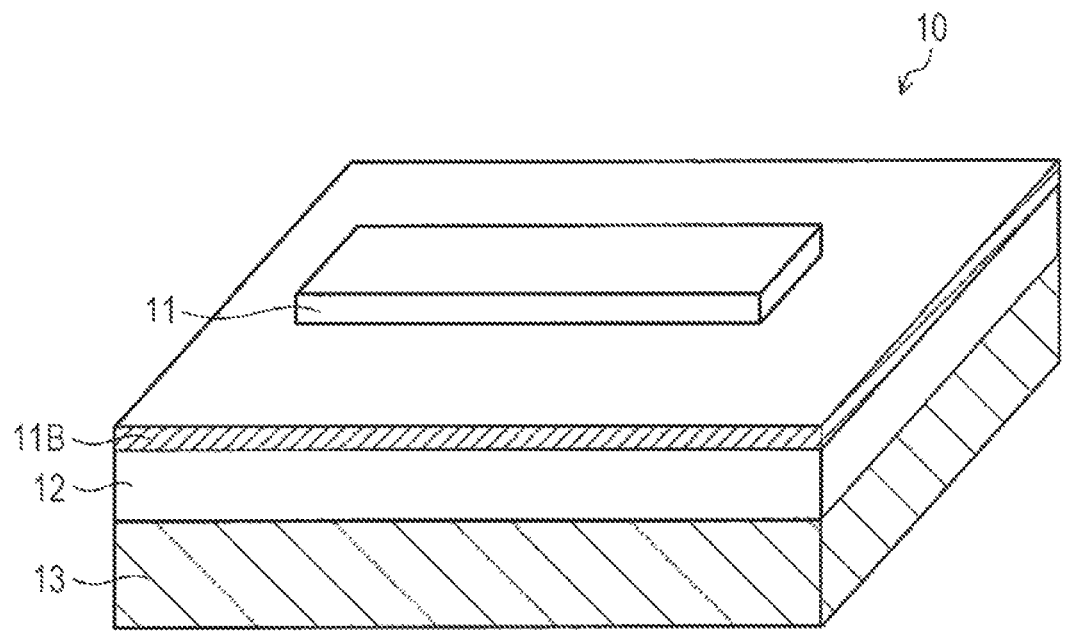
FIG. 2 is a diagram illustrating a basic configuration of a sensor according to the present disclosure.

Referring first to FIGS. 1 and 2, a basic configuration of a detecting system according to the present disclosure is described.

FIG. 1 is a diagram illustrating a basic configuration of a detecting system U according to the present disclosure. FIG. 2 is a diagram illustrating a basic configuration of a sensor 10 according to the present disclosure.

The detecting system U includes: a sensor 10 that has predetermined reflection characteristics with respect to electromagnetic waves (the characteristics will be hereinafter referred to simply as the "reflection characteristics of the sensor 10"); and a reader 20 that detects the reflection characteristics of the sensor 10 by receiving reflected waves Fr from the sensor 10 when electromagnetic waves Fa having a predetermined frequency are transmitted to the sensor 10. Note that the reader 20 is disposed in a fixed state at a position approximately several meters away from the sensor 10, so as to face the front surface of the sensor 10, for example.

In such a configuration, the detecting system U detects a state change in the sensor 10 (which is an environmental change to be detected by the sensor 10), on the basis of a change in the reflection characteristics of the sensor 10.

The sensor 10 includes an antenna unit 11, an isolation layer 12, and a back surface reflector 13 in this order from the front surface side.

The antenna unit 11 is a metal pattern formed on a base material 11B. The antenna unit 11 is formed with a metal pattern in a strip-like shape, for example, and has a resonance structure that resonates when electromagnetic waves Fa having a predetermined frequency are emitted. The antenna unit 11 then absorbs the electromagnetic waves Fa having the frequency that matches its own resonance frequency (when the frequency of the electromagnetic waves Fa is f0 in FIG. 1), for example. In a case where electromagnetic waves Fa having some other frequency are emitted, the antenna unit 11 reflects the electromagnetic waves Fa.

The resonance frequency of the antenna unit 11 is determined by the shape (mainly the length) of the metal pattern forming the antenna unit 11. Normally, when the maximum length of the antenna is ½λ of the frequency of the electromagnetic waves, the antenna resonates, and an absorption peak at which the intensity of the reflected waves at the frequency corresponding to the antenna length becomes lower appears.

The antenna unit 11 may be formed only with one antenna element, but the antenna unit 11 is preferably formed with a plurality of antenna elements to increase the intensity of reflected waves Fr.

Alternatively, the antenna unit 11 is preferably formed with a plurality of antenna elements having different lengths from one other, for example, so that the sensor 10 has a plurality of resonance frequencies. With this arrangement, the accuracy of the reader 20 detecting the reflection characteristics of the sensor 10 can be increased.

The method for forming the antenna unit 11 on the base material 11B may be any appropriate method such as a printing method. Further, a metal material such as copper, silver, gold, or aluminum is used as the material of the antenna unit 11. Note that, in a case where the antenna unit 11 is to have elasticity, it is desirable to use a metal material containing a binder or the like as the material of the antenna unit 11.

As for the base material 11B on which the antenna unit 11 is formed, a material having electromagnetic wave permeability such as paper or resin is used. However, the form of the base material 11B is not limited to a plate-like shape, and may be a curved shape, a tubular shape, or the like. In other words, the antenna unit 11 may be formed directly on an article such as a packaging material or a container. Further, the base material 11B may be an object to be detected by the sensor 10.

The isolation layer 12 is an insulating material or a space in which any object is not disposed. The isolation layer 12 is disposed between the antenna unit 11 and the back surface reflector 13, to insulate the antenna unit 11 and the back surface reflector 13 from each other.

In the isolation layer 12, the resonance phenomenon is further amplified in a case where a space (filled with air) in which any object is not disposed, or a low-dielectric constant material such as a foamed resin is used. As the dielectric constant of the isolation layer 12 changes, the resonance peak greatly changes.

The back surface reflector 13 is disposed so as to face the antenna unit 11 via the isolation layer 12, and reflects the electromagnetic waves Fa emitted onto the sensor 10. Ina plan view, the back surface reflector 13 is disposed over a wider region than the region in which the antenna unit 11 is formed, at a position facing the antenna unit 11, for example.

The back surface reflector 13 also functions to amplify the resonance phenomenon that occurs in the antenna unit 11. Specifically, in a case where the back surface reflector 13 is present, a resonance phenomenon that occurs in the antenna unit 11 also occurs between the antenna unit 11 and the back surface reflector 13, and the resonance phenomenon is amplified. That is, the back surface reflector 13 heightens the resonance peak in a case where a resonance phenomenon occurs in the antenna unit 11.

Note that the back surface reflector 13 is disposed at a position in which the distance from the antenna unit 11 is 0.01 mm to 1000 mm, for example. Within this range, an electromagnetic field easily appears between the antenna unit 11 and the back surface reflector 13, and the resonance phenomenon in the sensor 10 can be effectively amplified.

As the back surface reflector 13 is disposed on the back surface of the antenna unit 11 in this manner, the contrast of the intensity of reflected waves Fr can be increased between the reflected waves Fr generated by the sensor 10 at the time of resonance and the reflected waves Fr generated by the sensor 10 at the time of non-resonance.

Note that, in a case where a material having such characteristics that reflect electromagnetic waves, such as a metal material like silver, gold, copper, or aluminum, for example, is used as the back surface reflector 13, the resonance phenomenon is amplified. The resonance peak greatly varies with changes in such characteristics that reflect electromagnetic waves due to changes in the area of the back surface reflector 13 in the region facing the antenna unit 11.

In such a mode, the sensor 10 is designed so that the state of the antenna unit 11, the isolation layer 12, or the back surface reflector 13 is linked to changes in the state of the detection target (this aspect will be described later in detail). The sensor 10 then causes the reader 20 to detect a change in the state of the detection target from a change in the reflection characteristics of the reflected waves Fr generated when the electromagnetic waves Fa are emitted from the reader 20.

Note that the reflection characteristics of the sensor 10 indicating the state of the detection target are typically determined by the intensity of the reflected waves Fr generated from the sensor 10 when the electromagnetic waves Fa are emitted from the reader 20, or by the resonance frequency of the sensor 10.

The reader 20 includes a transmitting unit 21, a receiving unit 22, a state detecting unit 23, and a control unit 24.

The transmitting unit 21 transmits electromagnetic waves Fa having a predetermined frequency to the sensor 10. The transmitting unit 21 includes a transmitting antenna, an oscillator, and the like, for example.

The transmitting unit 21 transmits sinusoidal electromagnetic waves Fa having its peak intensity at a single frequency, for example. The transmitting unit 21 then temporally changes the transmission frequency of the electromagnetic waves Fa to be transmitted from the transmitting antenna, and performs a frequency sweep within a predetermined frequency band. When the resonance frequency of the sensor 10 matches the transmission frequency of the electromagnetic waves Fa to be transmitted by the transmitting unit 21, the resonance frequency of the sensor 10 is detected as a change in the intensity of the reflected waves Fr generated by the sensor 10.

Note that the frequency band of the electromagnetic waves Fa to be transmitted by the transmitting unit 21 is a millimeter wave band or a gigahertz frequency band, for example.

The receiving unit 22 receives the reflected waves Fr generated from the sensor 10 when the transmitting unit 21 transmits the electromagnetic waves Fa. The receiving unit 22 includes a receiving antenna, a network analyzer, and the like, for example. The receiving unit 22 then detects the reflection characteristics of the sensor 10, using an S parameter determined from the intensity of the reflected waves Fr and the like.

The state detecting unit 23 compares the reflection characteristics of the sensor 10 obtained from the reflected waves Fr received by the receiving unit 22 at the present time with the reflection characteristics of the sensor 10 stored beforehand as reference data 23D, and detects the state of the sensor 10 on the basis of the result of the comparison. For example, on the basis of the above comparison result, the state detecting unit 23 calculates the degree of change in the resonance frequency of the sensor 10 or the intensity of the reflected waves Fr generated by the sensor 10 at the present time, from the value indicated by the reference data 23D. By doing so, the state detecting unit 23 detects the state of the sensor 10.

The reference data 23D is data for converting the reflection characteristics of the sensor 10 at the present time into the state of the sensor 10 at the present time (which is the state of the object as the detection target). The reference data 23D is only required to be data that associates the state of the sensor 10 with the reflection characteristics of the sensor 10, and may be set on the basis of the pre-acquired reflection characteristics of the sensor 10, or may be set on the basis of the reflection characteristics of the sensor 10 detected earlier than the present time.

In the reference data 23D, information about the intensity of the reflected waves of each frequency is stored as information about the reflection characteristics of the sensor 10, for example. Further, in the reference data 23D, the shift amount of the resonance frequency of the sensor 10 and the amount of state change in the detection target are stored in association with each other, for example. Also, in the reference data 23D, the amount of change in the reflected wave intensity at the resonance frequency of the sensor 10 and the amount of state change the detection target are stored in association with each other, for example.

The control unit 24 controls the reader 20 in a comprehensive manner. Note that, to successively monitor the state of the object as the detection target, the control unit 24 causes the transmitting unit 21, the receiving unit 22, and the state detecting unit 23 to perform the processing described above at predetermined intervals, for example.

Note that the transmitting unit 21, the receiving unit 22, the state detecting unit 23, and the control unit 24 are formed with a CPU, a ROM, a RAM, and the like, for example. Part or all of the transmitting unit 21, the receiving unit 22, the state detecting unit 23, and the control unit 24 described above is then formed by the CPU referring to a control program and various kinds of data. However, part or all of each function may be realized by processing performed by a DSP or processing performed by a dedicated hardware circuit (an ASIC, for example), instead of processing performed by a CPU.

Next, various embodiments of detecting systems U according to the present disclosure are described.

First Embodiment

Figure 4A:
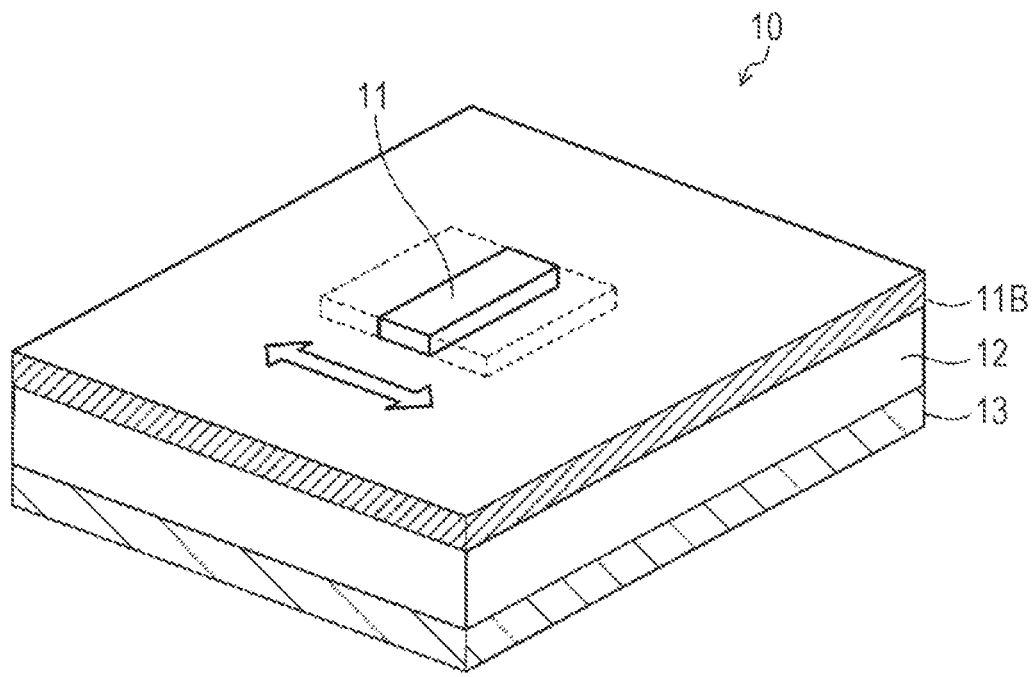
FIGS. 4A and 4B are diagrams illustrating a configuration of a sensor according to the first embodiment.
Figure 4B:
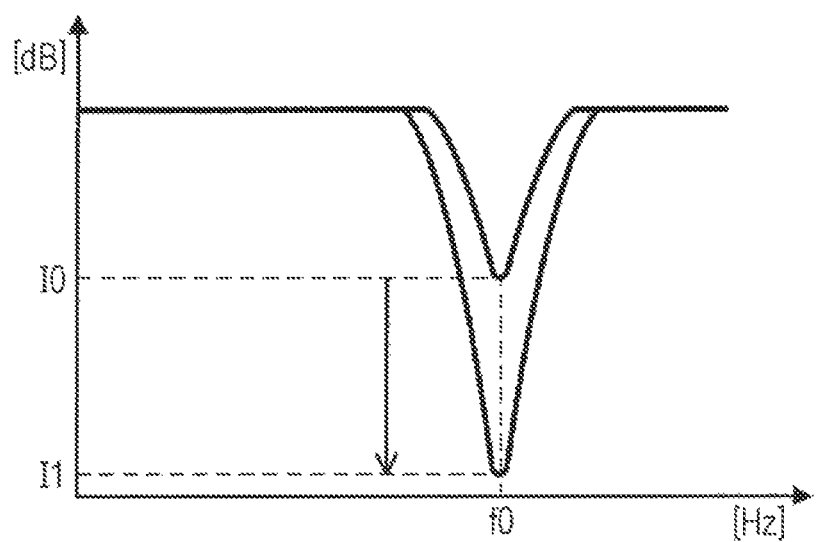
Figure 5:
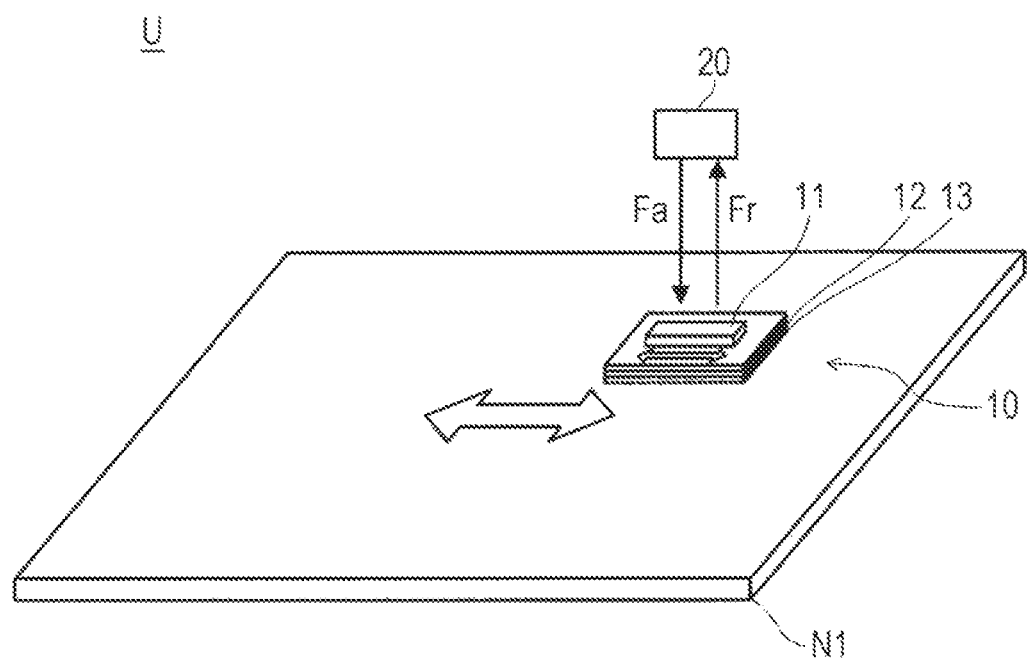
FIG. 5 is a diagram illustrating an example configuration of a detecting system according to the first embodiment.

FIGS. 3 and 4 are diagrams illustrating the configuration of a sensor 10 according to a first embodiment. FIG. 5 is a diagram illustrating an example configuration of a detecting system U according to the first embodiment.

The sensor 10 according to this embodiment is mounted on the detection target object in an expandable manner. A reader 20 then detects a change in the resonance frequency of the sensor 10 or a change in the intensity of reflected waves Fr from the sensor 10 due to expansion or contraction of an antenna unit 11.

Figure 3A:
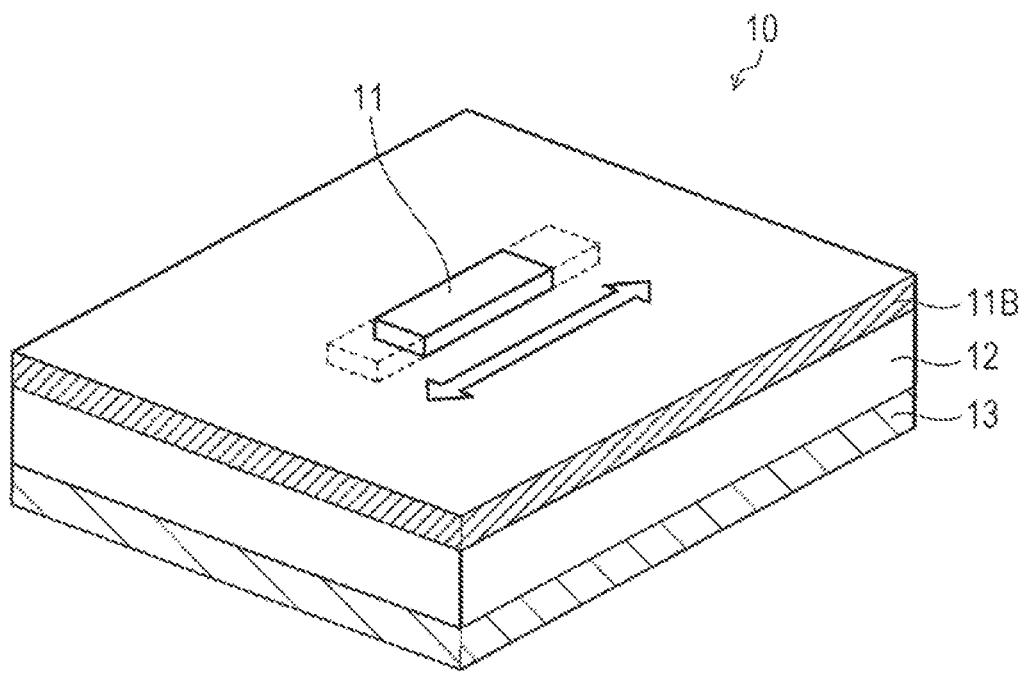
FIGS. 3A and 3B are diagrams illustrating a configuration of a sensor according to a first embodiment.
Figure 3B:
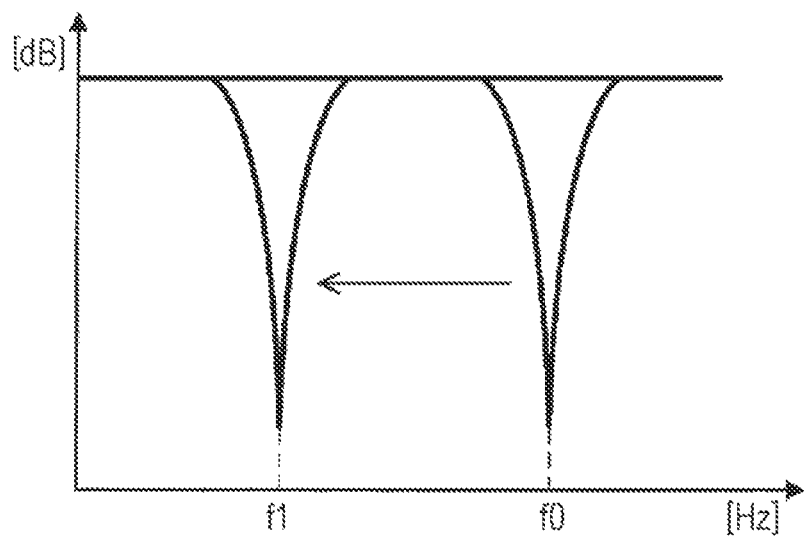

FIG. 3A illustrates a mode in which the antenna unit 11 expands and contracts in the longitudinal direction. FIG. 3B schematically illustrates a mode of change in the reflection characteristics of the sensor 10 in a case where the antenna unit 11 contracts in the longitudinal direction. Also, FIG. 4A illustrates a mode in which the antenna unit 11 expands and contracts in the width direction. FIG. 4B schematically illustrates a mode of change in the reflection characteristics of the sensor 10 in a case where the antenna unit 11 expands in the width direction.

As shown in FIGS. 3A and 3B, in a case where the antenna unit 11 expands or contracts in the longitudinal direction, the resonance frequency of the sensor 10 shifts from the resonance frequency prior to the expansion or contraction to the resonance frequency corresponding to the length of the antenna unit 11. For example, in a case where the antenna unit 11 contracts in the longitudinal direction, the resonance frequency of the sensor 10 shifts to the low frequency side (shifts from frequency f0 to frequency f1 as shown in FIG. 3B, for example).

Also, as shown in FIGS. 4A and 4B, in a case where the antenna unit 11 expands or contracts in the width direction, the area of the antenna unit 11 facing the back surface reflector 13 changes, and accordingly, the intensity of the reflected waves Fr from the sensor 10 changes from the intensity prior to the expansion or contraction. For example, in a case where the antenna unit 11 expands in the width direction, the intensity of the reflected waves Fr from the sensor 10 increases (increases from intensity I0 to intensity I1 as shown in FIG. 4B, for example).

Accordingly, the reader 20 can detect a change in the shape of the object to which the sensor 10 is attached, by detecting the reflection characteristics (the resonance frequency or the intensity) of the sensor 10 when the electromagnetic waves Fa are transmitted to the sensor 10. At this stage, the reader 20 detects expansion or contraction of the antenna unit 11, by comparing the detected reflection characteristics of the sensor 10 with the reflection characteristics of the sensor 10 stored in the reference data 23D. That is, with the detecting system U according to this embodiment, a shape change detecting system can be formed, for example.

In the sensor 10 according to this embodiment, the antenna unit 11, the isolation layer 12, and the back surface reflector 13 are each made of a stretchable material, for example, so that the sensor 10 can expand and contract in accordance with expansion and contraction of an object N1. However, the antenna unit 11 may be formed directly on the front surface of the object N1 to be detected, and the back surface reflector 13 may be disposed on the back surface side of the object N1 to be detected. In that case, only the antenna unit 11 needs to be expandable and contractible.

Note that, in the sensor 10 according to this embodiment, the isolation layer 12 and the back surface reflector 13 are designed not to have any state change, so that the reflection characteristics of the sensor 10 do not vary with changes in components other than expansion and contraction of the antenna unit 11.

FIGS. 6 and 7 are diagrams illustrating the configuration of a detecting system U according to a modification of this embodiment.

In the detecting system U according to this modification, a detecting antenna unit 11X is provided so as to face the antenna unit 11 of a sensor 10, and misalignment is detected between the base material 11B on which the antenna unit 11 is formed and a base material 11BX on which the detecting antenna unit 11X is formed. At this stage, when misalignment occurs between the base material 11B and the base material 11BX, the reader 20 detects a change in the reflection characteristics of the sensor 10, the change being caused by a change in the area of the region in which the antenna unit 11 and the detecting antenna unit 11X face each other.

Figure 6A:
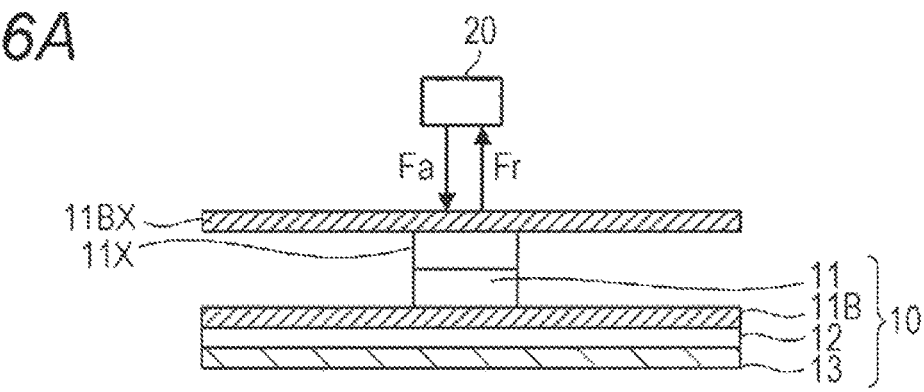
FIGS. 6A and 6B are diagrams illustrating a configuration of a detecting system according to a modification of the first embodiment.
Figure 6A:
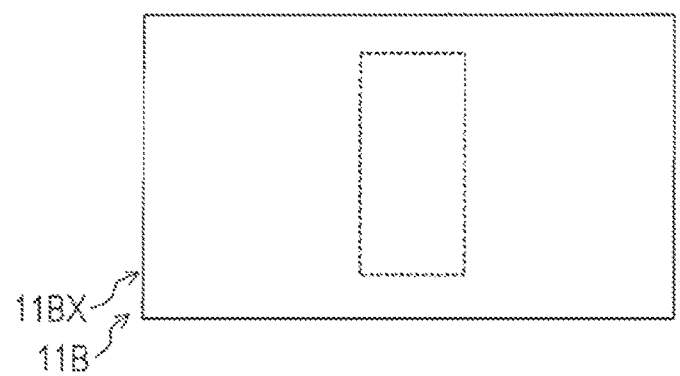
Figure 6B:
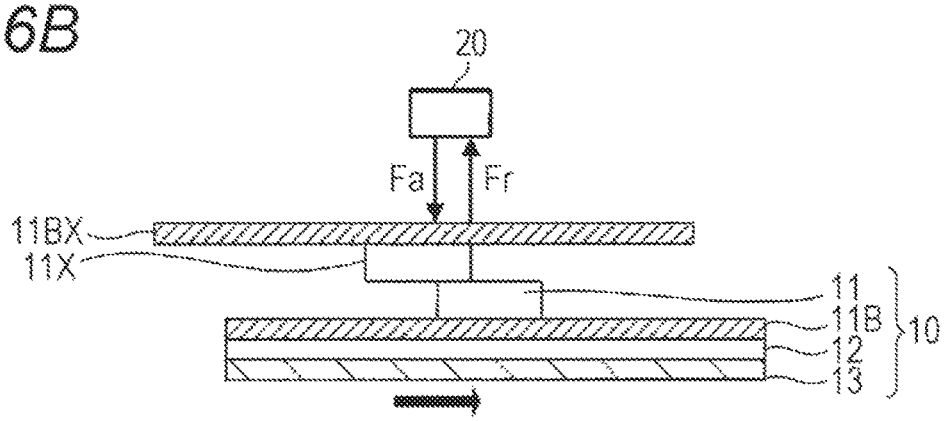
Figure 6B:
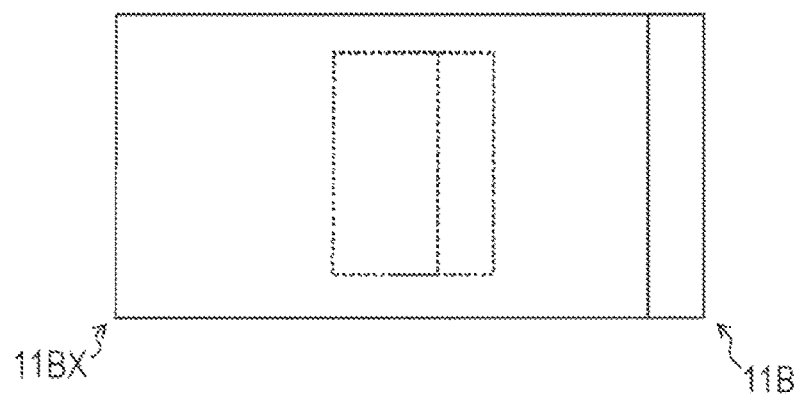

FIGS. 6A and 6B illustrate a mode in which the positional relationship between the antenna unit 11 and the detecting antenna unit 11X shifts in the width direction of the antenna unit 11. In FIGS. 6A and 6B, the upper drawing and the lower drawing show a side view and a plan view of the detecting system U, respectively.

In such a mode, a change in the positional relationship between the antenna unit 11 and the detecting antenna unit 11X appears as a change in the intensity of reflected waves Fr from the sensor 10 as in the mode illustrated in FIG. 4.

Figure 7A:
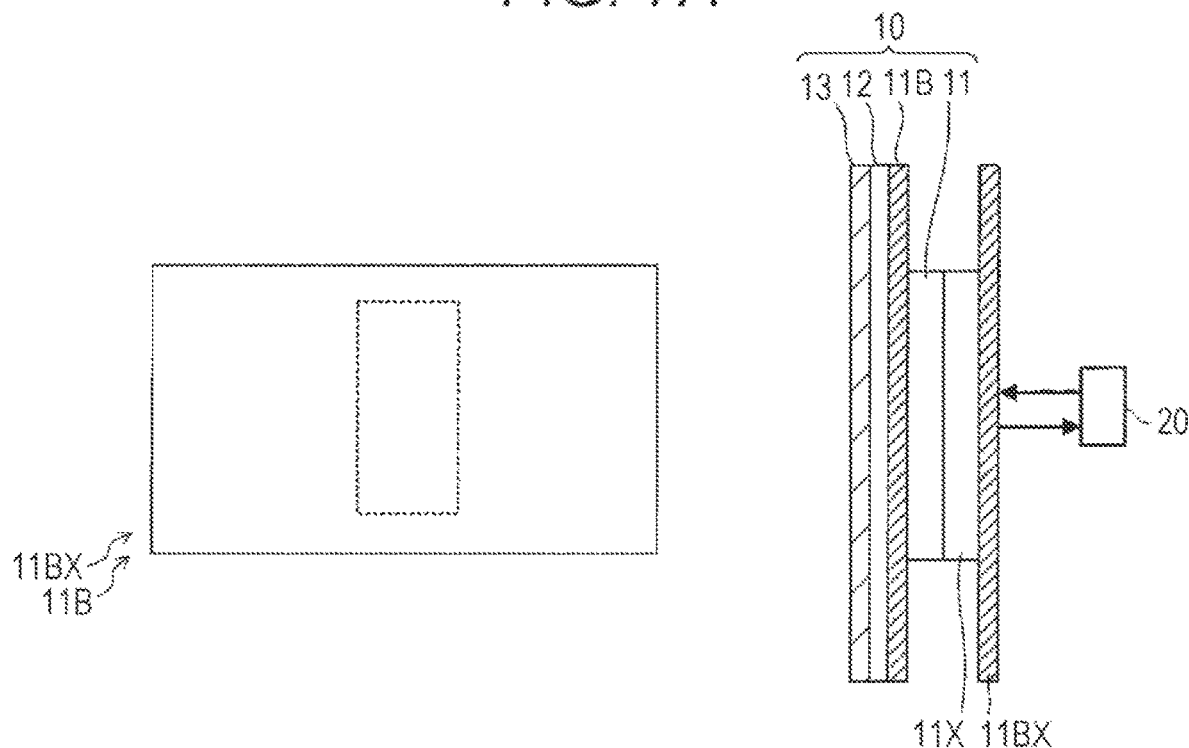
FIGS. 7A and 7B are diagrams illustrating a configuration of a detecting system according to a modification of the first embodiment.
Figure 7B:
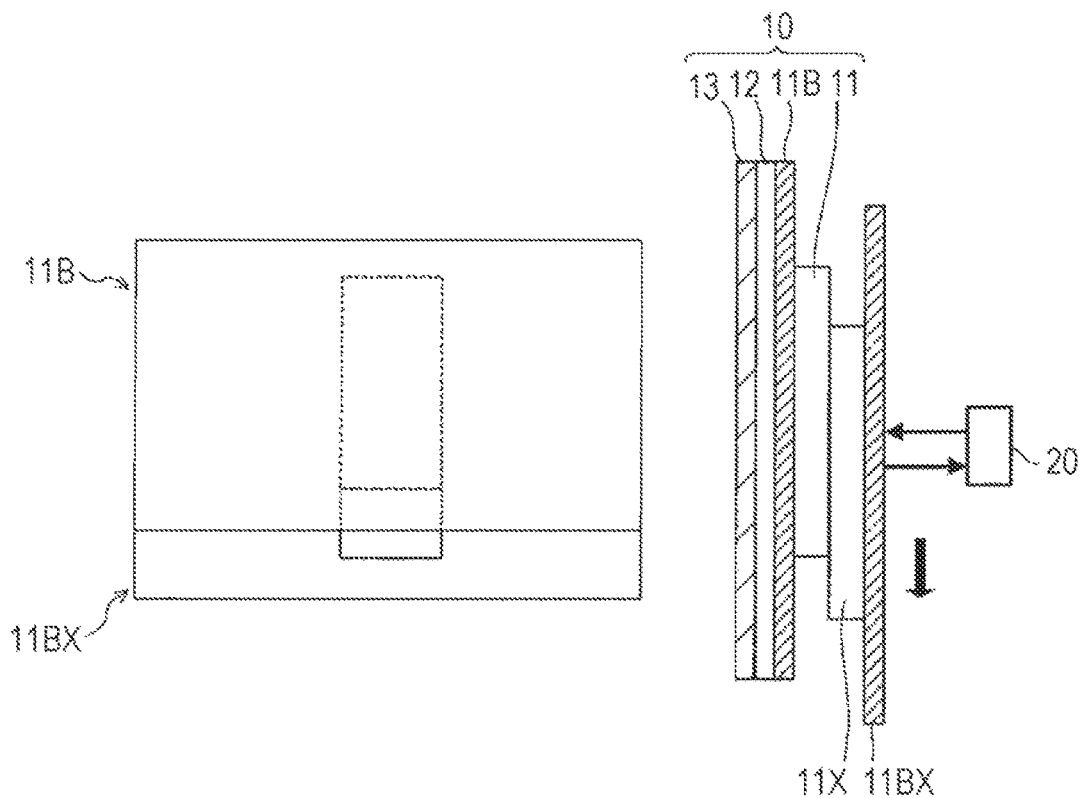

FIGS. 7A and 7B illustrate a mode in which the positional relationship between the antenna unit 11 and the detecting antenna unit 11X shifts in the longitudinal direction of the antenna unit 11. In FIGS. 7A and 7B, the upper drawing and the lower drawing show a side view and a plan view of the detecting system U, respectively.

In such a mode, a change in the positional relationship between the antenna unit 11 and the detecting antenna unit 11X appears as a change in the resonance frequency of the sensor 10 as in the mode illustrated in FIG. 3.

As described above, with the detecting system U according to this modification, the position of the base material 11B or the base material 11BX is set as the detection target, and the position of the base material 11B or the base material 11BX can be detected from a change in the reflection characteristics of the sensor 10.

Second Embodiment

FIG. 8 is a diagram illustrating the configuration of a sensor 10 according to a second embodiment. FIG. 9 is a diagram illustrating an example configuration of a detecting system U according to the second embodiment.

In the sensor 10 according to this embodiment, an isolation layer 12 is designed so that the detection target object can move in and out of the isolation layer 12. The isolation layer 12 is formed with a space communicating with the outside, for example, and is disposed so that the detection target object can move in and out of the space. Note that the detection target object that enters and exits the isolation layer 12 is not necessarily a solid material, but may be a liquid material or a particulate material.

A reader 20 according to this embodiment detects a change in the dielectric constant of the isolation layer 12 in a case where an object is carried into or penetrates into the isolation layer 12, or an object is carried out or flows out from the isolation layer 12. At this stage, the change in the dielectric constant of the isolation layer 12 is detected as a change in the resonance frequency of the sensor 10.

Figure 8A:
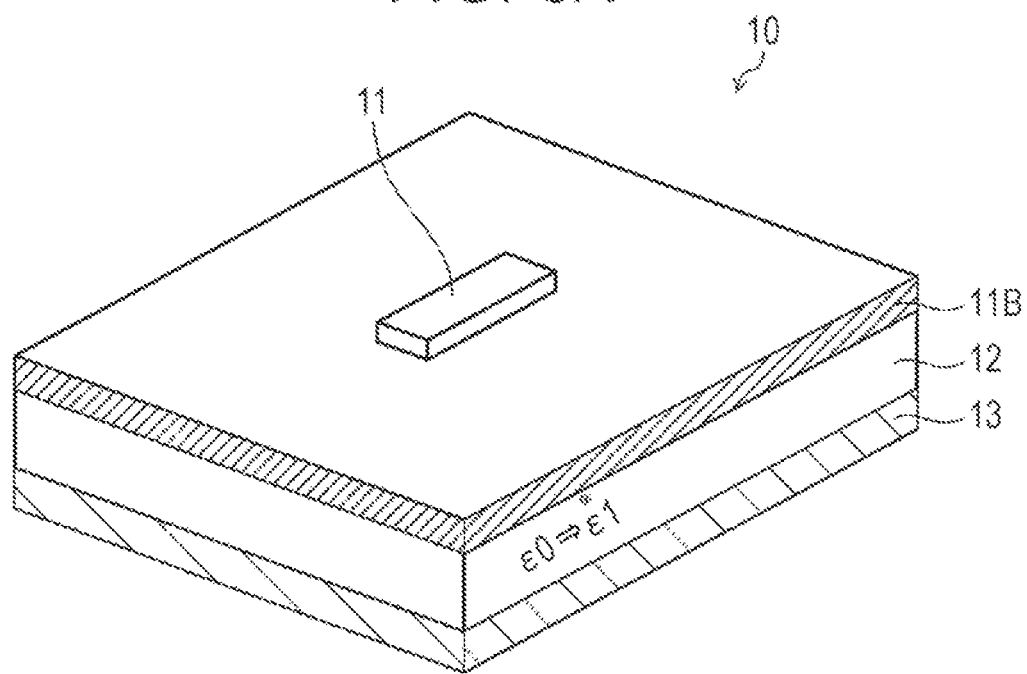
FIGS. 8A and 8B are diagrams illustrating a configuration of a sensor according to a second embodiment.
Figure 8B:
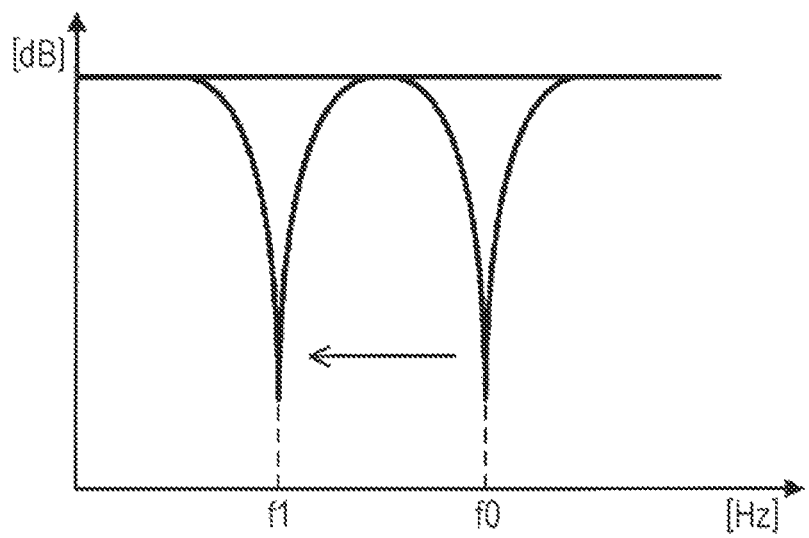

FIG. 8A illustrates a mode in which the dielectric constant of the isolation layer 12 changes. FIG. 8B schematically illustrates a mode of change in the reflection characteristics of the sensor 10 in a case where the dielectric constant of the isolation layer 12 becomes higher.

As shown in FIGS. 8A and 8B, in a case where the dielectric constant of the isolation layer 12 changes, the resonance frequency of the antenna unit 11 changes due to a wavelength shortening effect of the isolation layer 12. Therefore, the resonance frequency of the sensor 10 shifts to the resonance frequency corresponding to the dielectric constant of the isolation layer 12. It is known that such a wavelength shortening effect normally becomes greater as the dielectric constant of the dielectric material adjacent to the antenna unit 11 becomes higher. Therefore, in a case where the dielectric constant of the isolation layer 12 becomes higher, for example, the resonance frequency of the sensor 10 shifts to the low frequency side (shifts from frequency f0 to frequency f1 as shown in FIG. 8B, for example).

Accordingly, the reader 20 can detect a state change in the isolation layer 12 by detecting the reflection characteristics (the resonance frequency or the intensity) of the sensor 10.

Figure 9A:
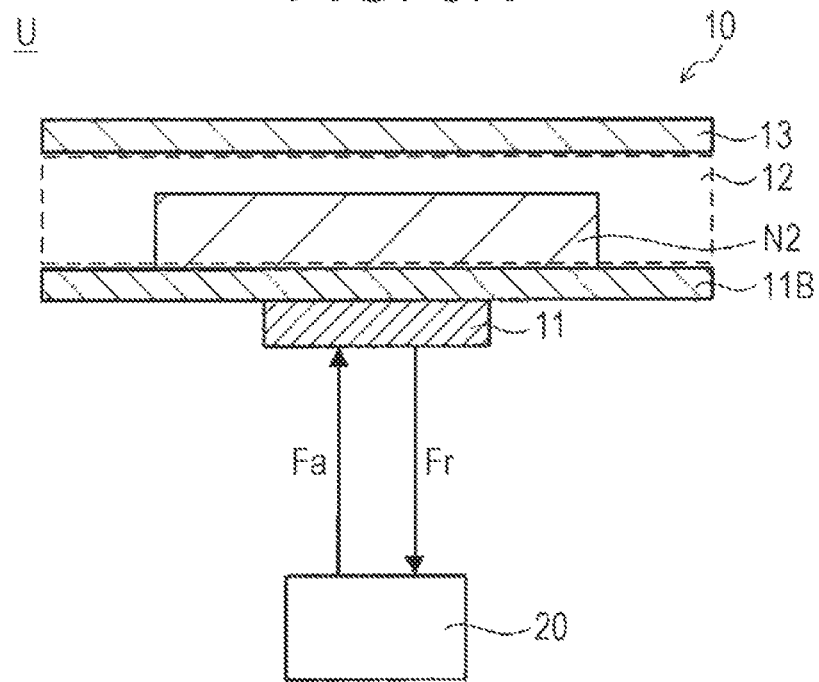
FIGS. 9A and 9B are diagrams illustrating an example configuration of a detecting system according to the second embodiment.
Figure 9B:
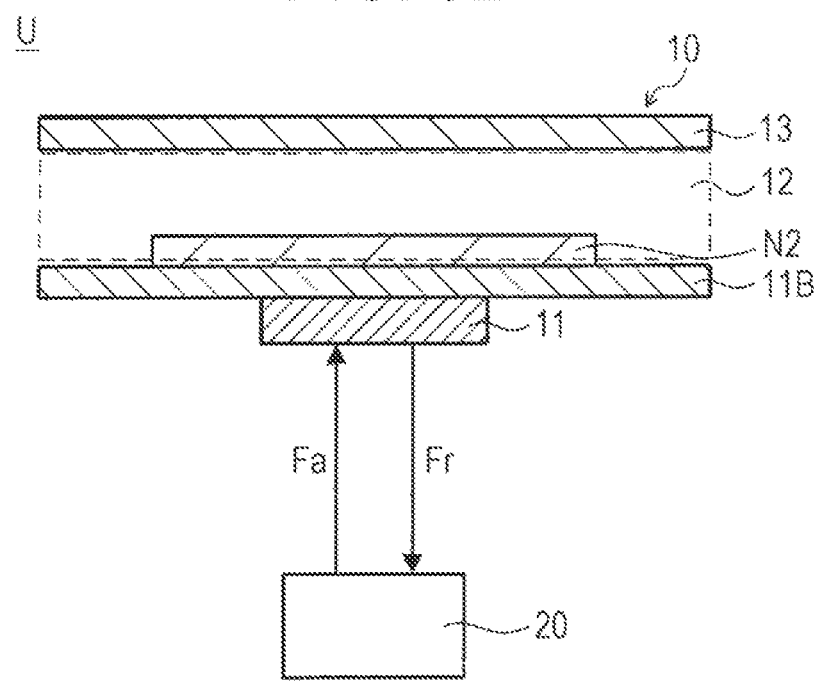

FIGS. 9A and 9B illustrate a mode in which the isolation layer 12 is designed as a storage space for accommodating an object (a medicine bag, for example) N2, as an example of a detecting system U according to this embodiment. Here, from a change in the dielectric constant of the isolation layer 12, the reader 20 detects a state change in which the object N2 in the storage space formed by the isolation layer 12 decreases in the isolation layer 12 (a decrease in the amount of medicine in the medicine bag, for example). Note that, in this case, the reader 20 detects the ratio between the detection target object and air in the isolation layer 12 as a dielectric constant.

In this manner, with the detecting system U according to this embodiment, a product management system can be formed, for example.

Note that, in the sensor 10 according to this embodiment, the antenna unit 11 and the back surface reflector 13 are designed not to have any state change, so that the reflection characteristics of the sensor 10 do not vary with changes in components other than changes in the dielectric constant of the isolation layer 12.

Figure 10:
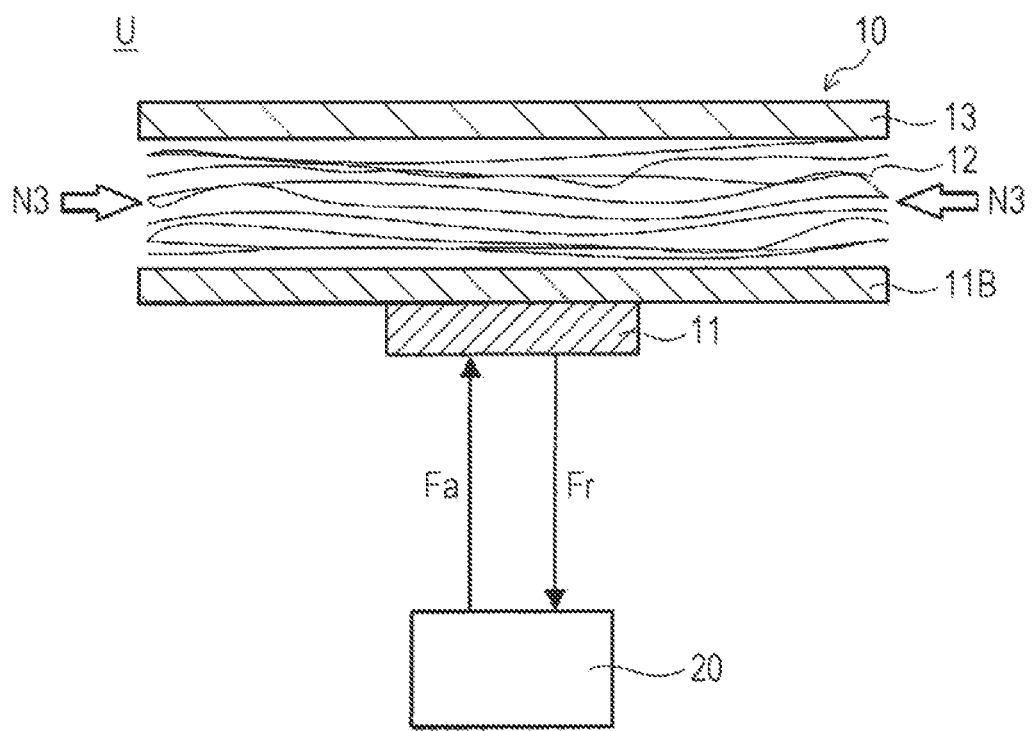
FIG. 10 is a diagram showing a configuration of a detecting system according to a first modification of the second embodiment.

FIG. 10 is a diagram illustrating the configuration of a detecting system U according to a first modification.

The detecting system U according to the first modification differs from the above embodiment in that the detection target is a liquid N3 that penetrates into the isolation layer 12.

In this modification, the isolation layer 12 is made of a liquid absorber, and the liquid N3 from the surroundings of the sensor 10 can penetrate into the isolation layer 12. From a change in the dielectric constant of the isolation layer 12 (the liquid absorber in this modification), the reader 20 according to this modification then detects a state in which the liquid N3 has penetrated into the isolation layer 12.

Figure 11:
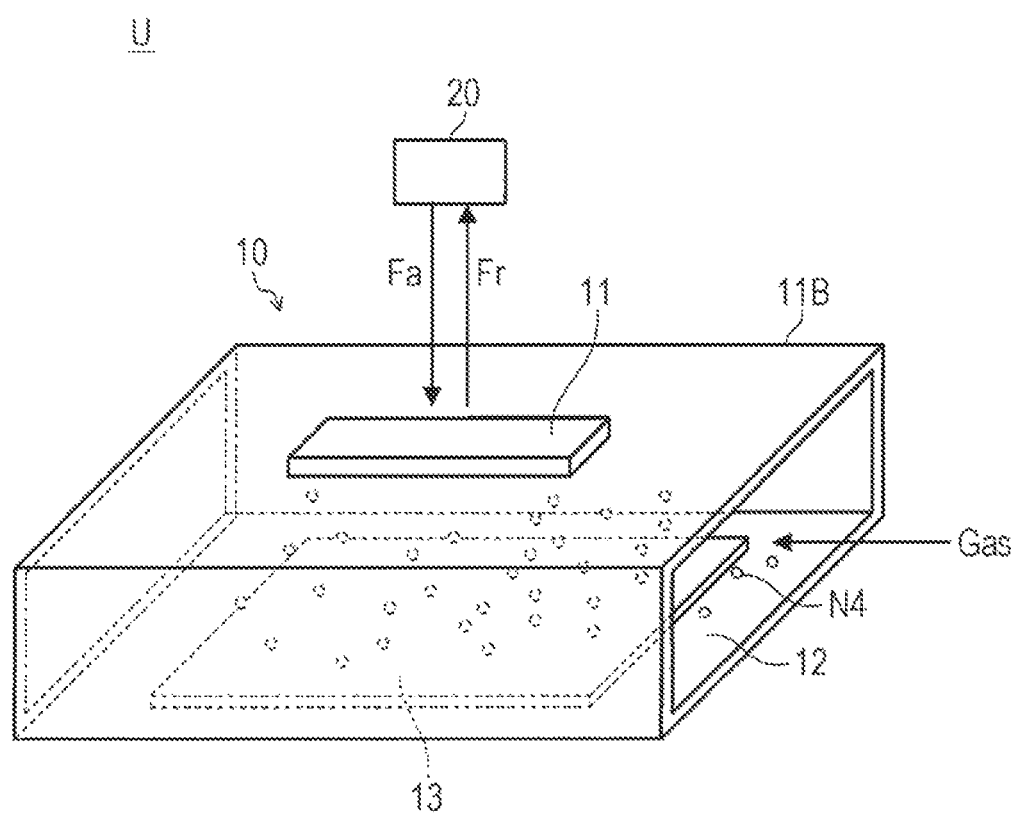
FIG. 11 is a diagram showing a configuration of a detecting system according to a second modification of the second embodiment.

FIG. 11 is a diagram illustrating the configuration of a detecting system U according to a second modification.

The detecting system U according to the second modification differs from the above embodiment in that the detection target is the density of a particulate material N4 flowing in the isolation layer 12.

In this modification, the isolation layer 12 is formed as a space in a pipe through which gas flows. The antenna unit 11 and the back surface reflector 13 of the sensor 10 are disposed on one side and the other side, with the space in the pipe being interposed in between.

The reader 20 according to this modification detects a change in the dielectric constant of the isolation layer 12, on the basis of a change in the resonance frequency of reflected waves Fr from the sensor 10. From the change in the dielectric constant of the isolation layer 12, the reader 20 according to this modification then detects the density of the particulate material N4 flowing in the isolation layer 12.

Third Embodiment

FIG. 12 is a diagram illustrating the configuration of a sensor 10 according to a third embodiment. FIG. 13 is a diagram illustrating an example configuration of a detecting system U according to the third embodiment.

In the sensor 10 according to this embodiment, the thickness of an isolation layer 12 (which is the distance between an antenna unit 11 and a back surface reflector 13) is designed to be variable. In other words, above or below the detection target object, the antenna unit 11 and the back surface reflector 13 are designed to change their positions with a change in the thickness of the object.

A reader 20 according to this embodiment detects a change in the intensity of reflected waves Fr from the sensor 10, the change accompanying a change in the thickness of the isolation layer 12.

Figure 12A:
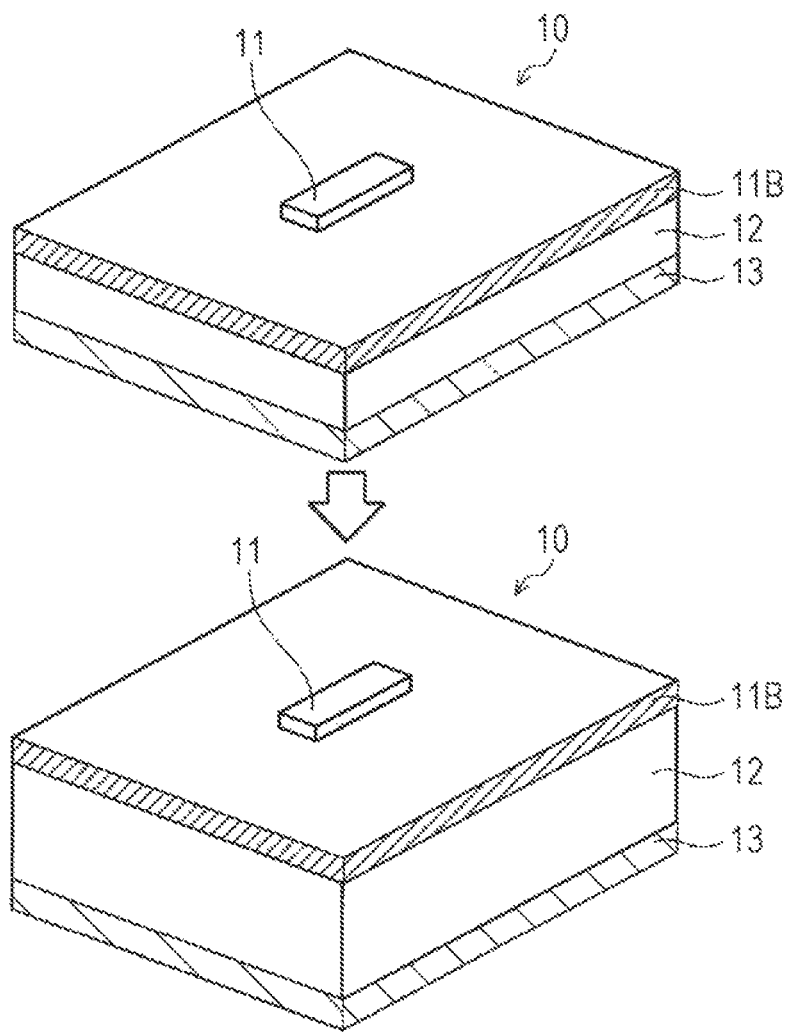
FIGS. 12A and 12B are diagrams illustrating a configuration of a sensor according to a third embodiment.
Figure 12B:
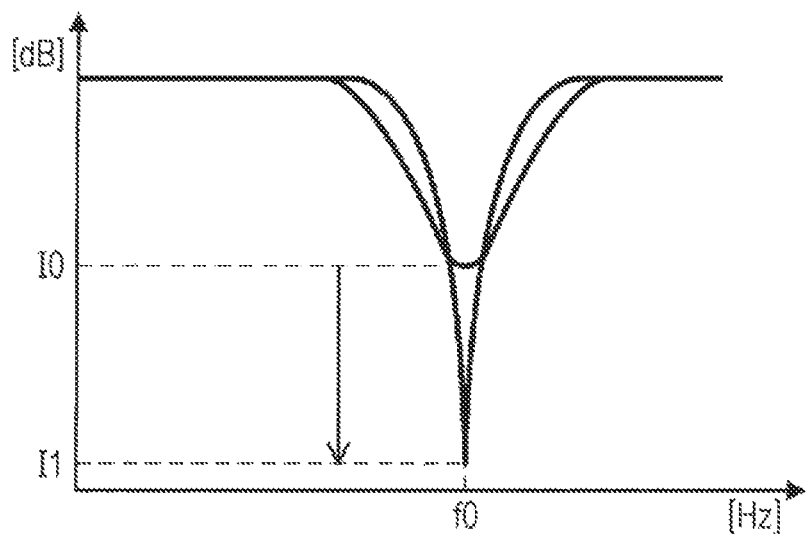
Figure 13:
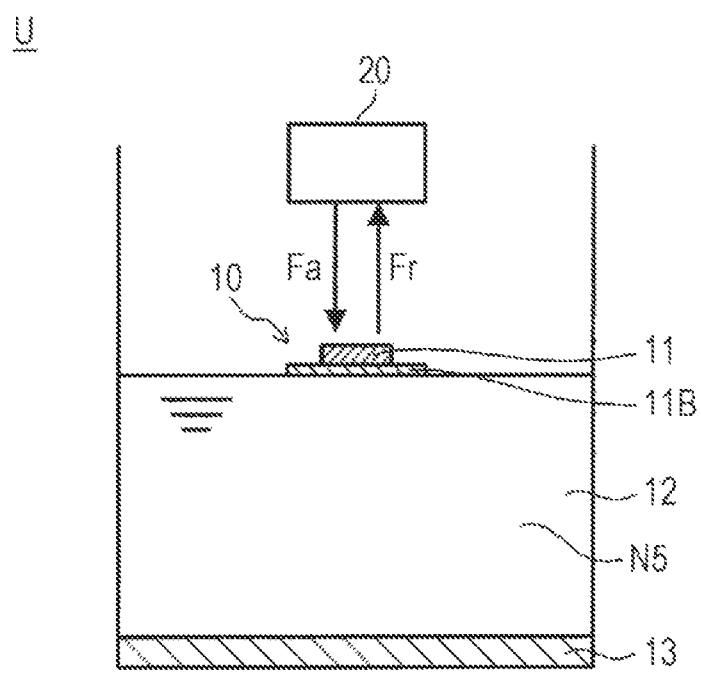
FIG. 13 is a diagram illustrating an example configuration of a detecting system according to the third embodiment.

FIG. 12A illustrates a mode in which the thickness of the isolation layer 12 changes. FIG. 12B schematically illustrates a mode of change in the refection characteristics of the sensor 10 in a case where the thickness of the isolation layer 12 becomes greater.

As shown in FIGS. 12A and 12B, in a case where the thickness of the isolation layer 12 changes, the degree of a resonance phenomenon between the antenna unit 11 and the back surface reflector 13 changes. The degree of such a resonance phenomenon is normally maximized when the distance between the antenna unit 11 and the back surface reflector 13 is a predetermined distance. The degree of such a resonance phenomenon becomes lower as the distance between the antenna unit 11 and the back surface reflector 13 increases from the predetermined distance. Accordingly, in a case where the thickness of the isolation layer 12 approaches the predetermined distance at which the degree of the resonance phenomenon between the antenna unit 11 and the back surface reflector 13 is maximized, for example, the intensity of the reflected waves Fr from the sensor 10 becomes higher (increases from intensity I0 to intensity I1 as shown in FIG. 12B, for example).

Thus, the reader 20 can detect the thickness of the isolation layer 12 (the liquid level of the liquid in this case) by detecting the reflection characteristics (the intensity of the reflected waves Fr in this case) of the sensor 10.

FIG. 13 illustrates a mode in which the isolation layer 12 is formed with a liquid N5 filling a container, as an example of a detecting system U according to this embodiment. The antenna unit 11 of the sensor 10 is then disposed in a floating state on the surface of the liquid N5 filling the container, and the back surface reflector 13 is disposed on the bottom surface of the container.

From a change in the intensity of reflected waves Fr from the sensor 10, the reader 20 detects the thickness of the isolation layer 12, which is the liquid level of the liquid N5 that fills the isolation layer 12. That is, with the detecting system U according to this embodiment, a liquid level management system can be formed, for example.

Note that, in the sensor 10 according to this embodiment, the antenna unit 11 and the back surface reflector 13 are designed not to have any state change, so that the reflection characteristics of the sensor 10 do not vary with changes in components other than changes in the thickness of the isolation layer 12.

Fourth Embodiment

Figure 14A:
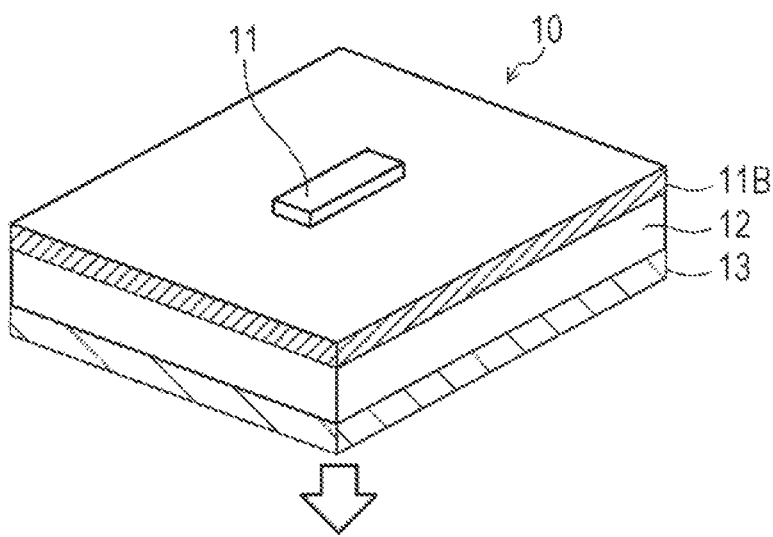
FIGS. 14A and 14B are diagrams illustrating a configuration of a sensor according to a fourth embodiment.
Figure 14A:
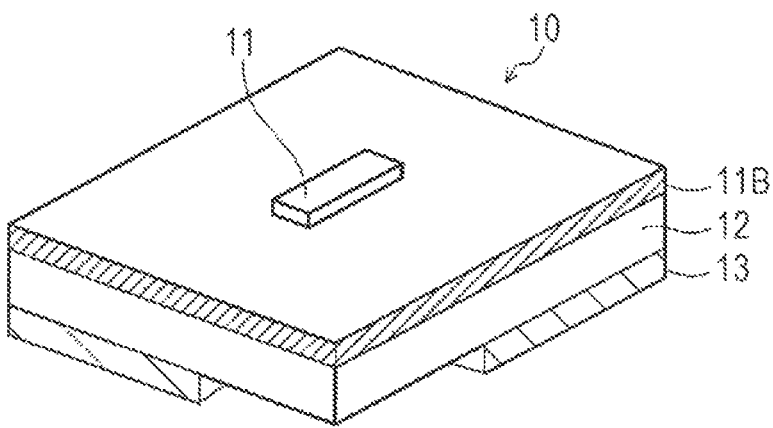

FIGS. 14 and 15 are diagrams illustrating the configuration of a sensor 10 according to a fourth embodiment. FIG. 16 is a diagram illustrating an example configuration of a detecting system U according to the fourth embodiment.

The back surface reflector 13 of the sensor 10 according to this embodiment is attached to the detection target object, and the area of the region facing the antenna unit 11 is designed to be variable depending on the position of the detection target object (the region facing the antenna unit 11 includes the region on the opposite side from the antenna unit 11 and its surrounding region, and will be hereinafter referred to as the "antenna facing region").

A reader 20 according to this embodiment detects a change in the area of the antenna facing region of the back surface reflector 13 of the sensor 10, on the basis of a change in the intensity of reflected waves Fr from the sensor 10.

Figure 14B:
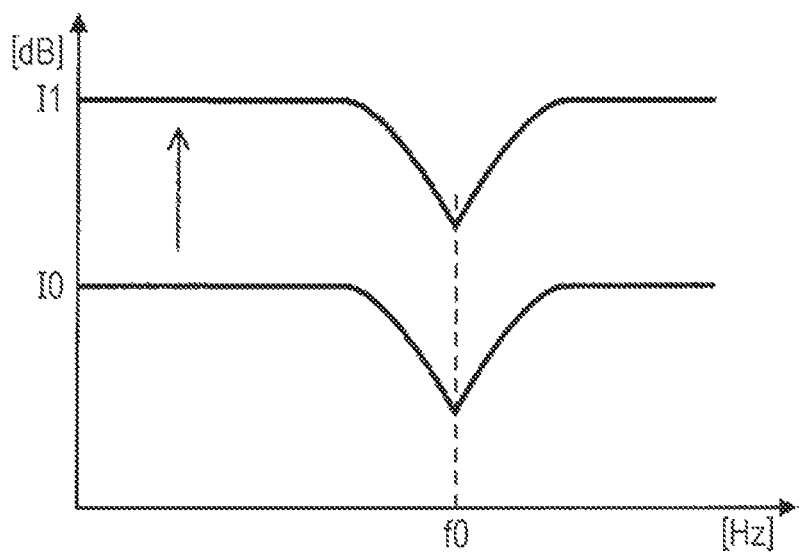

FIG. 14A illustrates a mode in which the area of the antenna facing region of the back surface reflector 13 changes, as part of the back surface reflector 13 is cut off. FIG. 14B schematically illustrates a mode of change in the reflection characteristics of the sensor 10 in a case where the area of the antenna facing region of the back surface reflector 13 decreases.

Figure 15A:
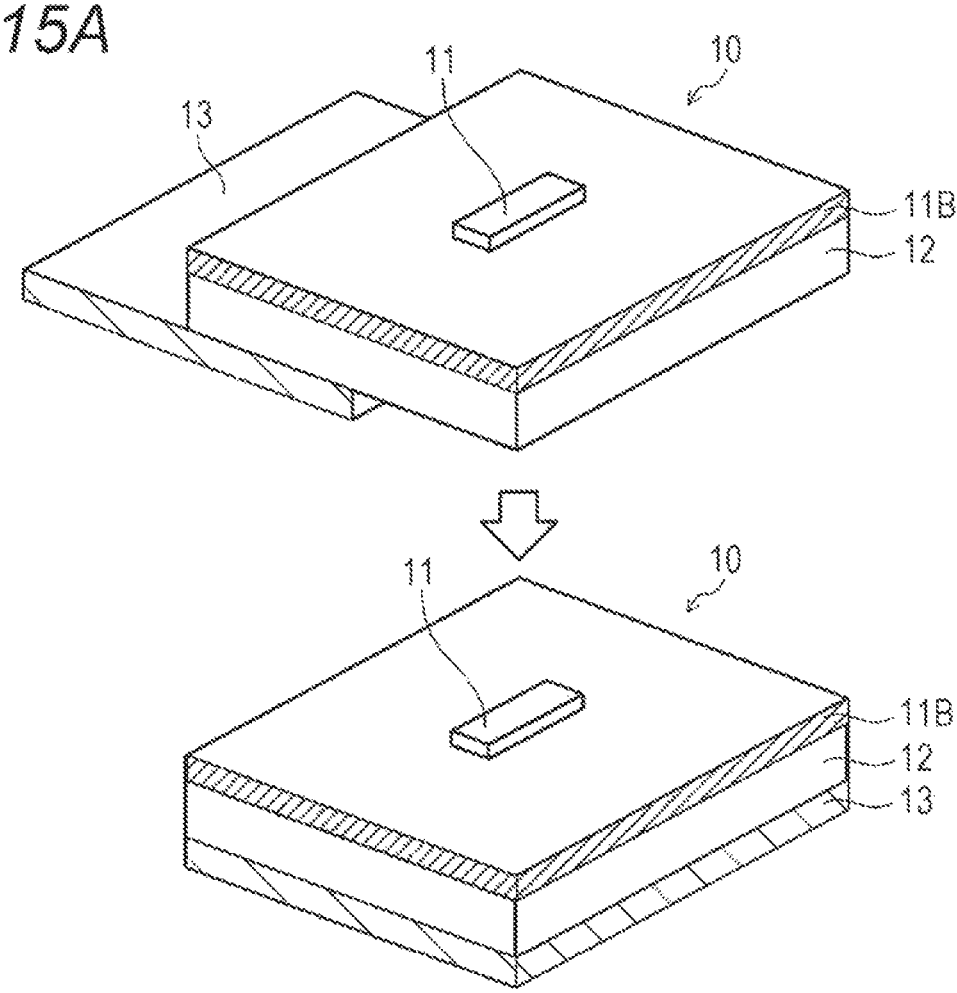
FIGS. 15A and 15B are diagrams illustrating a configuration of a sensor according to the fourth embodiment.
Figure 15B:
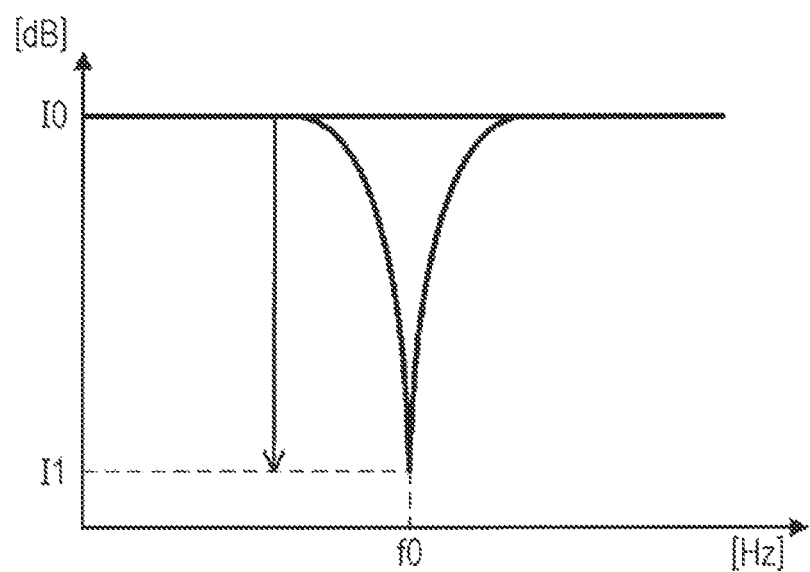

FIG. 15A illustrates a mode in which the area of the antenna facing region of the back surface reflector 13 changes, as the back surface reflector 13 moves. FIG. 15B schematically illustrates a mode of change in the reflection characteristics of the sensor 10 in a case where the area of the antenna facing region of the back surface reflector 13 increases.

As shown in FIGS. 14A and 14B, in a case where the area of the antenna facing region of the back surface reflector 13 decreases, the resonance phenomenon between the antenna unit 11 and the back surface reflector 13 weakens. Therefore, the degree of electromagnetic wave absorption by the sensor 10 weakens. In such a case, the intensity of the reflected waves Fr of the sensor 10 increases (increases from intensity I0 to intensity I1 as shown in FIG. 14B, for example).

On the other hand, as shown in FIGS. 15A and 15B, in a case where the area of the antenna facing region of the back surface reflector 13 increases, the resonance phenomenon between the antenna unit 11 and the back surface reflector 13 becomes stronger. Therefore, the degree of electromagnetic wave absorption by the sensor 10 becomes stronger. In such a case, the intensity of the reflected waves Fr of the sensor 10 decreases (decreases from intensity I0 to intensity I1 as shown in FIG. 15B, for example).

Thus, the reader 20 can detect a state change in the back surface reflector 13, by detecting the intensity of the reflected waves Fr from the sensor 10.

Figure 16A:
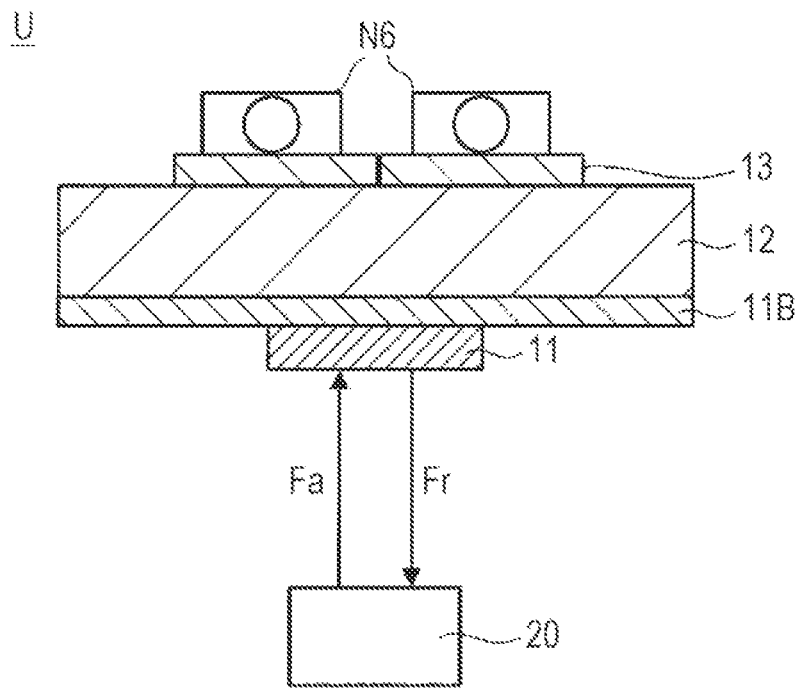
FIGS. 16A and 16B are diagrams illustrating an example configuration of a detecting system according to the fourth embodiment.
Figure 16B:
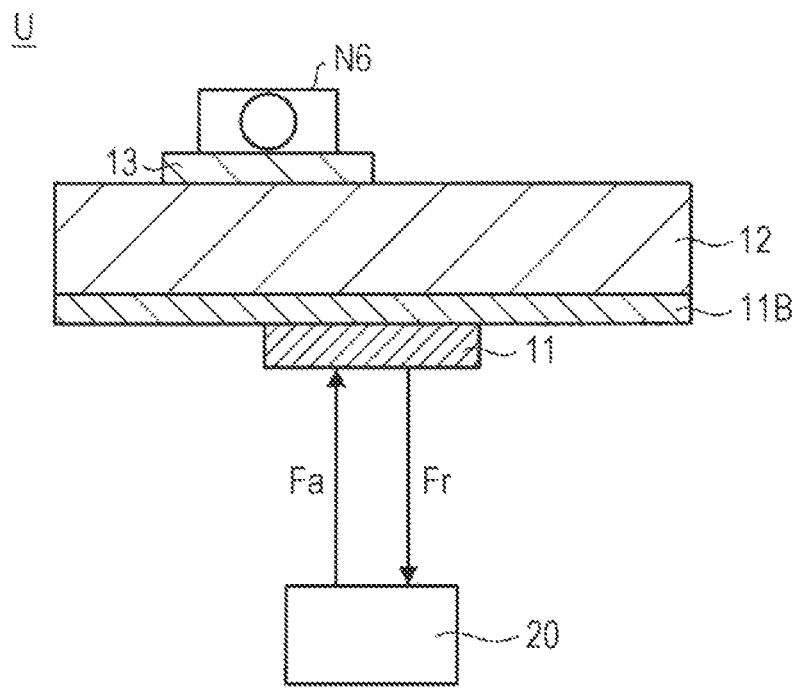

FIGS. 16A and 16B illustrate, as an example of a detecting system U according to this embodiment, a mode in which the back surface reflector 13 of the sensor 10 is formed integrally with detection target objects (individual medicines, for example) N6, and the back surface reflector 13 is designed to be detachable together with the detection target objects N6. In the mode illustrated in FIGS. 16A and 16B, the reader 20 detects the number of detection target objects N6 detached from the sensor 10, on the basis of a change in the intensity of reflected waves Fr from the sensor 10. That is, with the detecting system U according to this embodiment, a medication management system can be formed, for example.

Note that, in the sensor 10 according to this embodiment, the antenna unit 11 and the isolation layer 12 are designed not to have any state change, so that the reflection characteristics of the sensor 10 do not vary with changes in components other than the area of the antenna facing region of the back surface reflector 13.

Fifth Embodiment

Figure 17A:
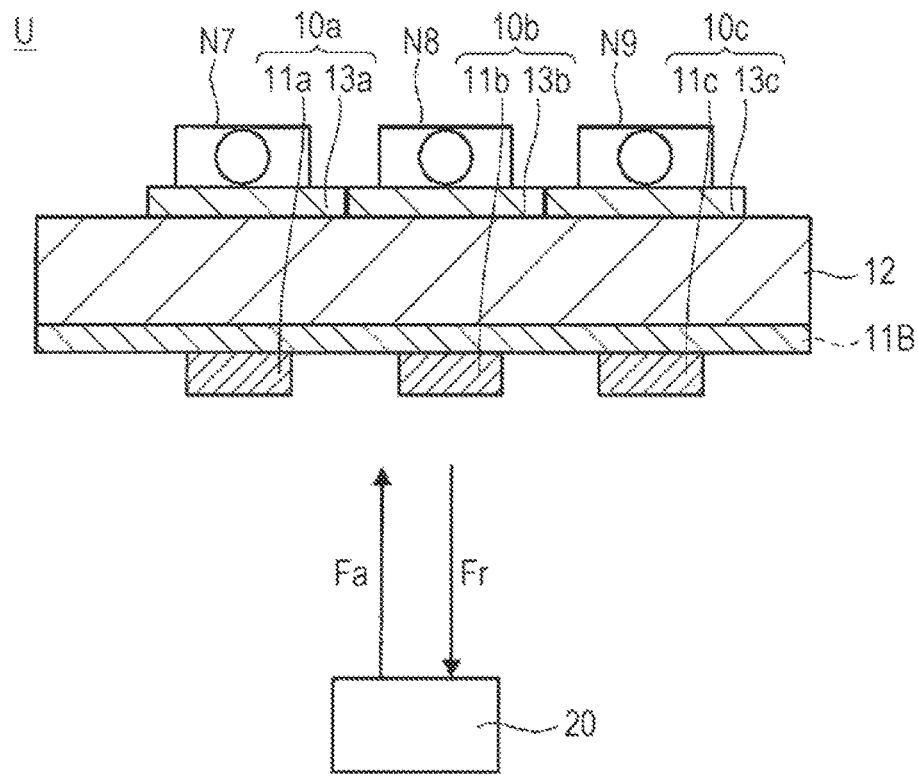
FIGS. 17A and 17B are diagrams illustrating an example configuration of a detecting system according to a fifth embodiment.
Figure 17B:
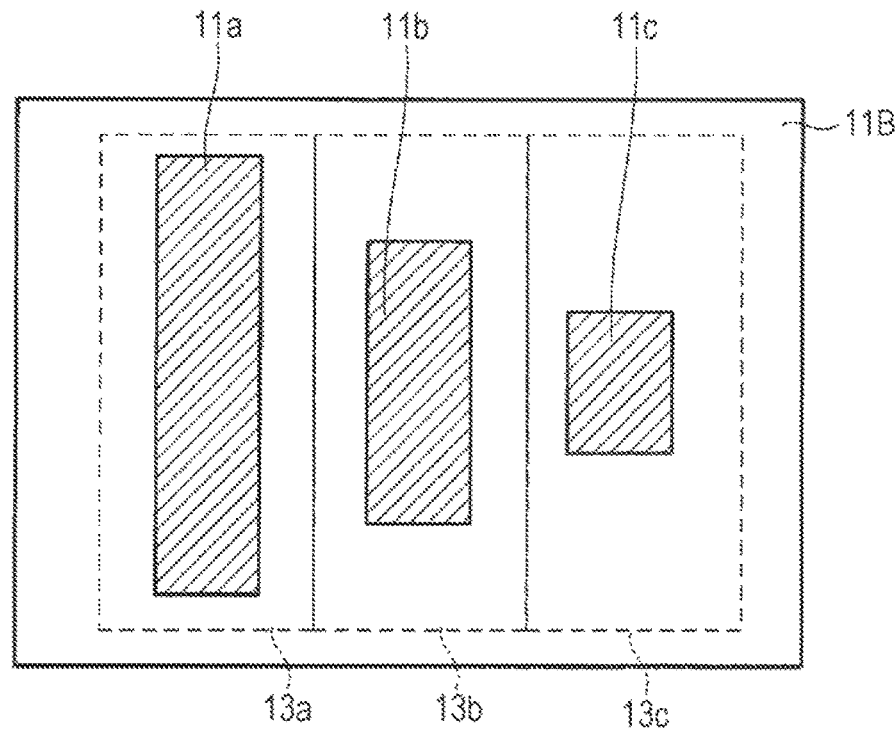

FIG. 17 is a diagram illustrating an example configuration of a detecting system U according to a firth embodiment.

The detecting system U according to this embodiment includes a plurality of sensors 10a, 10b, and 10c having resonance frequencies different from one another, and a reader 20 that detects state changes in the sensors 10a. 10b, and 10c separately from one another.

Each sensor (10a. 10b, or 10c in this case) according to this embodiment is designed to have a different resonance frequency from the other sensors (10a, 10b, or 10c in this case) through adjustment of the lengths of antenna units 11a, 11b, and 11c in the longitudinal direction, for example. That is, each of the sensors 10a, 10b, and 10c has its resonance frequency forming identification information for distinguishing itself from the other sensors (10a. 10b, or 10c in this case). Each of the sensors 10a, 10b, and 10c then detects its state change.

Each of the sensors 10a, 10b, and 10c according to this embodiment has the same configuration as the sensor 10 described in the fourth embodiment. The sensors 10a, 10b, and 10c are then provided for a plurality of detection target objects (medicines, for example) N7, N8, and N9, respectively, so that detached states of the respective detection target objects N7, N8, and N9 can be monitored. Note that, in this case, the sensors 10a, 10b, and 10c share the isolation layer 12 and the base material 11B, and include the antenna units 11a, 11b, and 11c, respectively, and back surface reflectors 13a, 13b, and 13c, respectively.

The reader 20 emits electromagnetic waves Fa to the sensors 10a, 10b, and 10c, and detects the reflection characteristics of each of the sensors 10a, 10b, and 10c. The reader 20 then compares the detected reflection characteristics of the respective sensors 10a. 10b, and 10c with the reflection characteristics of the sensors 10a, 10b, and 10c indicated by the reference data 23D, and detects the state of each of the sensors 10a, 10b, and 10c.

At this stage, the reader 20 identifies the states of the respective sensors 10a, 10b, and 10c, on the basis of the resonance frequencies of the respective sensors 10a. 10b, and 10c. That is, in a case where any one of the sensors 10a, 10b, and 10c is detached, the reader 20 detects a state in which the intensity of the reflected waves Fr at the resonance frequency corresponding to that sensor drops.

In this manner, with the detecting system U according to this embodiment, the state of each of the detection target objects can be individually managed with one reader 20, for example.

Note that a mode in which the state of each of the detection target objects is individually managed with the sensors 10a, 10b, and 10c having different resonance frequencies from one another as in this embodiment can of course be applied to any sensor 10 described in the first to third embodiments.

Effects

As described above, a detecting system U according to the present disclosure includes: a sensor 10 that includes an antenna unit 11 formed with a metal pattern, and a back surface reflector 13 that faces the antenna unit 11 via an isolation layer 12; and a reader 20 that transmits electromagnetic waves Fa to the sensor 10, receives reflected waves Fr from the sensor 10, and compares the reflection characteristics of the sensor 10 detected from the reflected waves Fr with the reflection characteristics of the sensor 10 stored in advance, to detect a state change in the sensor 10.

Accordingly, with the detecting system U according to this embodiment, a change in the reflection characteristics of the sensor 10 can be detected with high accuracy. Thus, a state change in the object to be detected by the sensor 10, or an environmental change in the surroundings of the object can be detected with high accuracy.

Other Embodiments

The present invention is not limited to the above embodiments, and various modifications can be made to them.

For example, a detecting system U according to the present disclosure may detect a state in which part of the antenna unit 11 is peeled off, or a state in which the antenna unit 11 is attached thereto.

Alternatively, a detecting system U according to the present disclosure may detect a change in the material forming the isolation layer 12 or a change in the material forming the back surface reflector 13.

Further, the antenna unit 11 that is used in a detecting system U according to the present disclosure may be of a type that reflects electromagnetic waves Fa when electromagnetic waves Fa having the frequency that matches the resonance frequency of the antenna unit 11 are emitted, and absorbs electromagnetic waves Fa having some other frequency. In this case, it is also desirable that the back surface reflector 13 is disposed at a position 0.01 mm to 1000 mm away from the antenna unit 11, for example. Within this range, the back surface reflector 13 functions to amplify the reflected waves generated at the antenna unit 11.

Although specific examples of the present invention have been described in detail so far, these are merely examples and do not limit the scope of claims. The technology disclosed in the claims includes various changes and modifications of the specific examples described above.

The contents disclosed in the specification, drawings, and abstract in JP 2018-207687, filed on Nov. 2, 2018, are all incorporated herein by reference.

INDUSTRIAL APPLICABILITY

With a detecting system according to the present disclosure, a state change in an object or an environmental change in the surroundings of an object can be detected with high accuracy.

REFERENCE SIGNS LIST

U Detecting system
10, 10a, 10b, 10c Sensor
11, 11a, 11b, 11c Antenna unit
11B Base material
12 Isolation layer
13, 13a, 13b, 13c Back surface reflector
12 Reader
21 Transmitting unit
22 Receiving unit
23 State detecting unit
23D Reference data
24 Control unit
11X Detecting antenna unit
11BX Base material for detecting antenna unit
Fa Electromagnetic waves
Fr Reflected waves
N1 to N9 Detection target object

The invention claimed is:

1. A detecting system comprising:
   a sensor including: an antenna part formed with a metal pattern; and a back surface reflector that faces the antenna part via an isolation layer; and
   a reader that transmits electromagnetic waves to the sensor, receives reflected waves from the sensor, and compares reflection characteristics of the sensor detected from the reflected waves with reflection characteristics of the sensor stored in advance, to detect a state change in the sensor, wherein
   the isolation layer is configured such that an object as a detection target moves in and out of the isolation layer, and
   the reader detects a change in abundance or abundance density of the object in the isolation layer, from a change in a dielectric constant of the isolation layer.

2. The detecting system according to claim 1, wherein the reader transmits the electromagnetic waves to the sensor while temporally changing transmission frequency, to perform a sweep with the transmission frequency.

3. The detecting system according to claim 2, wherein the reader detects a state change in the sensor, by comparing a resonance frequency of the sensor detected from the reflected waves with a resonance frequency of the sensor stored in advance.

4. The detecting system according to claim 2, wherein the reader detects a state change in the sensor, by comparing an intensity of the reflected waves with an intensity of the reflected waves indicated by the reflection characteristics of the sensor stored in advance.

5. The detecting system according to claim 2, wherein the sensor is configured such that one of a state of the antenna part, a state of the isolation layer, or a state of the back surface reflector is linked to a state of a detection target, and
   the reader detects a state change in the detection target, by comparing the reflection characteristics of the sensor detected from the reflected waves with the reflection characteristics of the sensor stored in advance.

6. The detecting system according to claim 2, wherein the antenna part is mounted in a stretchable state on an object as a detection target, and
   the reader detects a change in a stretched state of the object from a change in a stretched state of the antenna part.

7. The detecting system according to claim 2, wherein the antenna part or the back surface reflector above or below an object as a detection target is formed so as to change in position with a change in thickness of the object, and
   the reader detects a change in the thickness of the object, from a change caused in a resonance phenomenon in the antenna part by a change in distance between the antenna part and the back surface reflector.

8. The detecting system according to claim 2, wherein the back surface reflector is attached to an object as a detection target, and
   the reader detects a change in a position of the object, from a change caused in a resonance phenomenon in the antenna part by a change in an area of the back surface reflector in a region facing the antenna part.

9. The detecting system according to claim 2, comprising a plurality of the sensors having resonance frequencies different from one another,
   wherein the reader detects state changes in the respective sensors separately from one another, from the resonance frequencies of the respective sensors.

10. The detecting system according to claim 1, wherein the reader detects a state change in the sensor, by comparing a resonance frequency of the sensor detected from the reflected waves with a resonance frequency of the sensor stored in advance.

11. The detecting system according to claim 10, wherein the reader detects a state change in the sensor, by comparing an intensity of the reflected waves with an intensity of the reflected waves indicated by the reflection characteristics of the sensor stored in advance.

12. The detecting system according to claim 1, wherein the reader detects a state change in the sensor, by comparing an intensity of the reflected waves with an intensity of the reflected waves indicated by the reflection characteristics of the sensor stored in advance.

13. The detecting system according to claim 1, wherein the sensor is configured such that one of a state of the antenna part, a state of the isolation layer, or a state of the back surface reflector is linked to a state of a detection target, and the reader detects a state change in the detection target, by comparing the reflection characteristics of the sensor detected from the reflected waves with the reflection characteristics of the sensor stored in advance.

14. The detecting system according to claim 1, wherein the back surface reflector is attached to an object as a detection target, and the reader detects a change in a position of the object, from a change caused in a resonance phenomenon in the antenna part by a change in an area of the back surface reflector in a region facing the antenna part.

15. The detecting system according to claim 1, comprising a plurality of the sensors having resonance frequencies different from one another, wherein the reader detects state changes in the respective sensors separately from one another, from the resonance frequencies of the respective sensors.

16. A detecting system comprising:

a sensor including: an antenna part formed with a metal pattern; and a back surface reflector that faces the antenna part via an isolation layer; and a reader that transmits electromagnetic waves to the sensor, receives reflected waves from the sensor, and compares reflection characteristics of the sensor detected from the reflected waves with reflection characteristics of the sensor stored in advance, to detect a state change in the sensor, wherein the antenna part is mounted in a stretchable state on an object as a detection target, and the reader detects a change in a stretched state of the object from a change in a stretched state of the antenna part.

17. A detecting system comprising:

a sensor including: an antenna part formed with a metal pattern; and a back surface reflector that faces the antenna part via an isolation layer; and a reader that transmits electromagnetic waves to the sensor, receives reflected waves from the sensor, and compares reflection characteristics of the sensor detected from the reflected waves with reflection characteristics of the sensor stored in advance, to detect a state change in the sensor, wherein the antenna part or the back surface reflector above or below an object as a detection target is formed so as to change in position with a change in thickness of the object, and the reader detects a change in the thickness of the object, from a change caused in a resonance phenomenon in the antenna part by a change in distance between the antenna part and the back surface reflector.

18. A reader that detects a state change in a sensor that includes an antenna part formed with a metal pattern and a back surface reflector facing the antenna part via an isolation layer, the isolation layer being configured such that an object as a detection target moves in and out of the isolation layer, the reader comprising:

a hardware processor that: transmits electromagnetic waves to the sensor;

receives reflected waves from the sensor, the reflected waves being generated when the hardware processor transmits the electromagnetic waves; and detects a state change in the sensor, by comparing reflection characteristics of the sensor detected from the reflected waves received by the hardware processor with reflection characteristics of the sensor stored in advance, wherein the reader detects a change in abundance or abundance density of the object in the isolation layer, from a change in a dielectric constant of the isolation layer.

* * * * *